US011813928B1

(12) United States Patent
Runyan et al.

(10) Patent No.: US 11,813,928 B1
(45) Date of Patent: Nov. 14, 2023

(54) WEATHER SEAL SYSTEM FOR A VEHICLE SUNROOF

(71) Applicant: Aisin Technical Center of America, Inc., Northville, MI (US)

(72) Inventors: Joel Thomas Runyan, Canton, MI (US); Michael Mixon, Brighton, MI (US); Jacob Grimaldo, Westland, MI (US); Tatsuya Matsui, Novi, MI (US)

(73) Assignee: AISIN Technical Center of America, Inc., Northville, MI (US)

( * ) Notice: Subject to any disclaimer, the term of this patent is extended or adjusted under 35 U.S.C. 154(b) by 22 days.

(21) Appl. No.: 17/730,697

(22) Filed: Apr. 27, 2022

(51) Int. Cl.
*B60J 10/00* (2016.01)
*B60J 10/24* (2016.01)
(Continued)

(52) U.S. Cl.
CPC ........... *B60J 10/82* (2016.02); *B60J 10/00* (2013.01); *B60J 10/24* (2016.02); *B60J 10/248* (2016.02);
(Continued)

(58) Field of Classification Search
CPC . B60J 10/00; B60J 10/043; B60J 10/15; B60J 10/21; B60J 10/24; B60J 10/27;
(Continued)

(56) References Cited

U.S. PATENT DOCUMENTS 5,561,961 A 10/1996 Paul
9,944,158 B2 * 4/2018 Beach .................... B60J 10/80
(Continued)

FOREIGN PATENT DOCUMENTS

CN 214564538 U 11/2021
DE 3814522 A1 11/1998
(Continued)

OTHER PUBLICATIONS

Alibaba, "High resilience other car exterior car door and sunroof rain-proof rubber seal gasket strip", Retrieved from: https://www.alibaba.com/product-detail/High-resilience-other-car-exterior-car_1600352316115.html?spm=a2700.7724857.normal_offer.d_title.54c6116ctvpViO, Accessed on Apr. 26, 2022.
(Continued)

*Primary Examiner* — Amy R Weisberg
*Assistant Examiner* — Joyce Eileen Hill
(74) *Attorney, Agent, or Firm* — Christopher G. Darrow; Darrow Mustafa PC (57) ABSTRACT

A weather seal system is provided for sealing a perimeter of a vehicle sunroof. The system includes a mounting base having an outboard first channel, and an inboard second channel spaced apart from, and extending generally parallel to, the outboard first channel. At least two connecting portions are positioned between and connecting the first and second channels. A spine is supported by the at least two connecting portions so as to reside above the first and second channels when the mounting base is mounted on a vehicle. The spine extends generally parallel to the outboard first channel. At least a first and a second opposed weather strip retention projections extend from respective opposite first and second sides of the spine. A weather strip is structured to engage the opposed first and second weather strip retention projections so as to secure the weather strip to the spine.

11 Claims, 8 Drawing Sheets

(51) Int. Cl.
  *B60J 10/248* (2016.01)
  *B60J 10/27* (2016.01)
  *B60J 10/33* (2016.01)
  *B60J 10/82* (2016.01)
  *B60J 10/90* (2016.01)

(52) U.S. Cl.
  CPC .............. *B60J 10/27* (2016.02); *B60J 10/33* (2016.02); *B60J 10/90* (2016.02)

(58) Field of Classification Search
  CPC ... B60J 10/33; B60J 10/80; B60J 10/82; B60J 10/84; B60J 10/86; B60J 10/90; B60J 10/248; B60J 10/2335; Y10T 29/49826
  USPC .... 296/213, 216.01, 216.06, 216.07, 216.08, 296/216.09
  See application file for complete search history.

(56) References Cited

U.S. PATENT DOCUMENTS

| | | | |
|---|---|---|---|
| 2001/0033062 A1 | 10/2001 | Maass | |
| 2004/0232733 A1* | 11/2004 | Ota | B60J 10/21 296/216.06 |
| 2006/0230686 A1 | 10/2006 | Plum et al. | |
| 2017/0015184 A1* | 1/2017 | Sawada | B60J 10/24 |
| 2017/0348936 A1 | 12/2017 | Kim et al. | |

FOREIGN PATENT DOCUMENTS

| | | | | |
|---|---|---|---|---|
| DE | 19808044 A1 | 9/1999 | | |
| EP | 0842823 A1 | 5/1998 | | |
| ES | 2167184 A1 | 5/2002 | | |
| FR | 2520467 A1 | 7/1983 | | |
| FR | 2548742 A1 | 1/1987 | | |
| GB | 2334990 A * | 9/1999 | | B60J 10/22 |

OTHER PUBLICATIONS

Alibaba, "factory price auto rubber parts waterproof sunroof rubber beading seal strip U Shape", Retrieved from: https://www.alibaba.com/product-detail/factory-price-auto-rubber-parts-waterproof_1600208069162.html?spm=a2700.7724857.normal_offer.d_title.54c6116ctvpViO, Accessed on Apr. 26, 2022.

The Sunroof Doctor, "SFC Autoport 1530 Sunroof Weatherstrip", Retrieved from: http://www.sunroofdoctor.com/SFC-Autoport-1530-Sunroof-Weatherstrip_p_10.html, Accessed on Apr. 26, 2022.

* cited by examiner

WEATHER SEAL SYSTEM FOR A VEHICLE SUNROOF

FIELD OF THE DISCLOSURE

This disclosure relates generally to vehicles and, more particularly, to an apparatus for sealing a perimeter of a sunroof mounted on a vehicle.

BACKGROUND

Motor vehicles typically employ sunroofs to improve comfort of vehicle occupants by allowing sunlight to enter a vehicle cabin through a sunroof panel (e.g., glass). Some vehicle sunroofs are configured to open and close, which may be desirable to the vehicle occupants (e.g., when the vehicle cabin is relatively hot). For example, a known vehicle sunroof may have a panel that can be moved (e.g., tilted, raised, lowered, etc.) in response to a sunroof motor generating output. However, it is necessary to provide seals between edges of the sunroof and edges of a vehicle roof aperture in which the sunroof is mounted. Under certain condition, forces may be exerted on the sunroof seals which exceed the retention forces provided by weather seal retention mechanisms.

SUMMARY

In one aspect of the embodiments described herein, a weather seal system is provided for sealing a perimeter of a vehicle sunroof. The system includes a mounting base having an outboard first channel, and an inboard second channel spaced apart from, and extending generally parallel to, the outboard first channel. At least two connecting portions are positioned between and connecting the first and second channels. A spine is supported by the at least two connecting portions so as to reside above the first and second channels when the mounting base is mounted on a vehicle. The spine extends generally parallel to the outboard first channel. At least a first and a second opposed weather strip retention projections extend from respective opposite first and second sides of the spine. A weather strip is structured to engage the opposed first and second weather strip retention projections so as to secure the weather strip to the spine.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Described herein are aspects of a weather seal system for sealing a perimeter of a vehicle sunroof. The system includes a mounting base having an outboard first channel, and an inboard second channel spaced apart from, and extending generally parallel to, the outboard first channel A plurality of connecting portions may be positioned between the first and second channels to connect the first and second channels. A spine is supported by the channels so as to reside above the channels, and spaced apart pairs of first and a second opposed weather strip retention projections extend from respective opposite first and second sides of the spine. A weather strip is structured to engage the opposed first and second weather strip retention projections so as to secure the weather strip to the spine.

Figure 1:
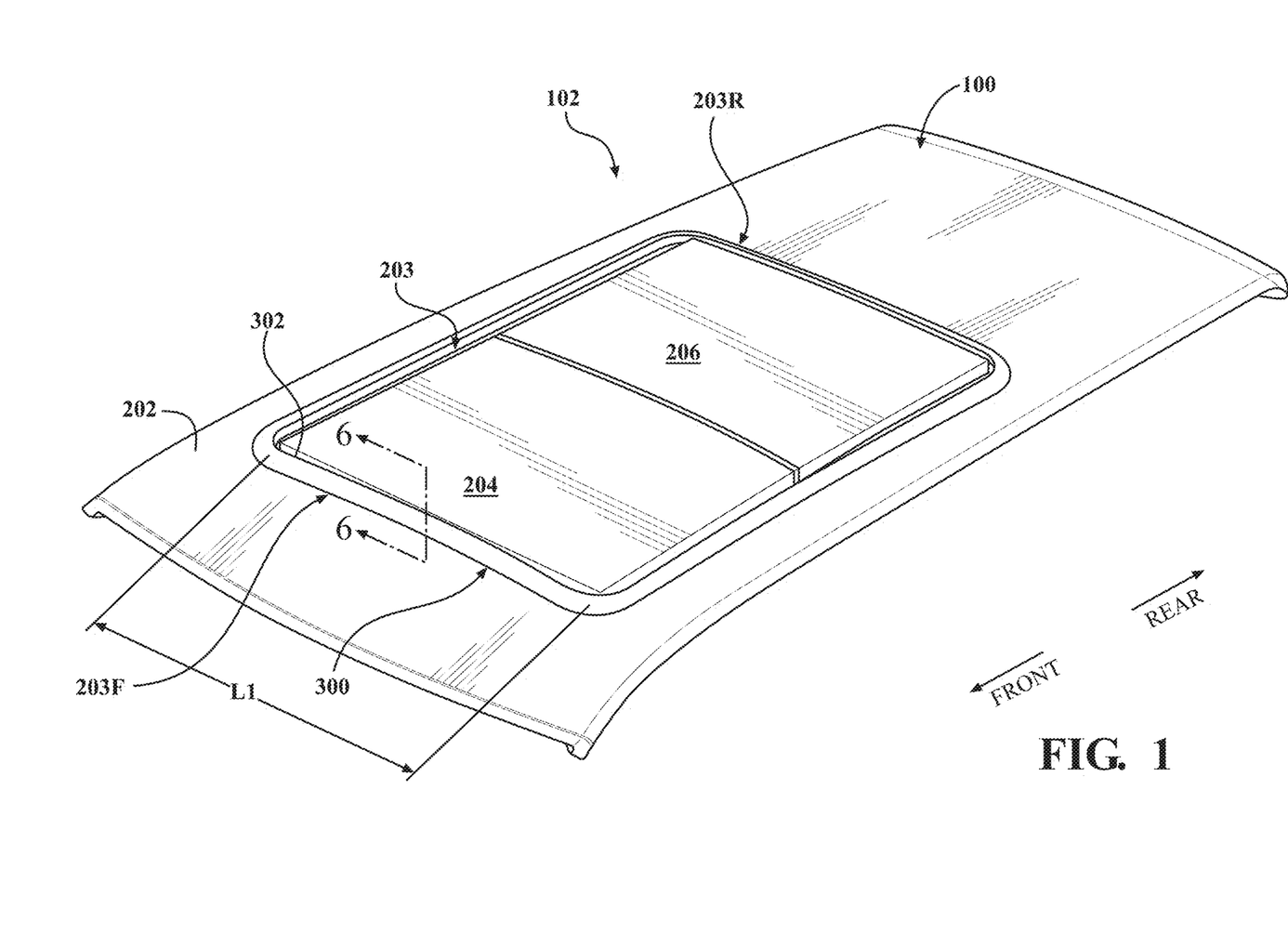
FIG. 1 is a view of an example vehicle in which examples of the weather seal system disclosed herein can be implemented.
Figure 2:
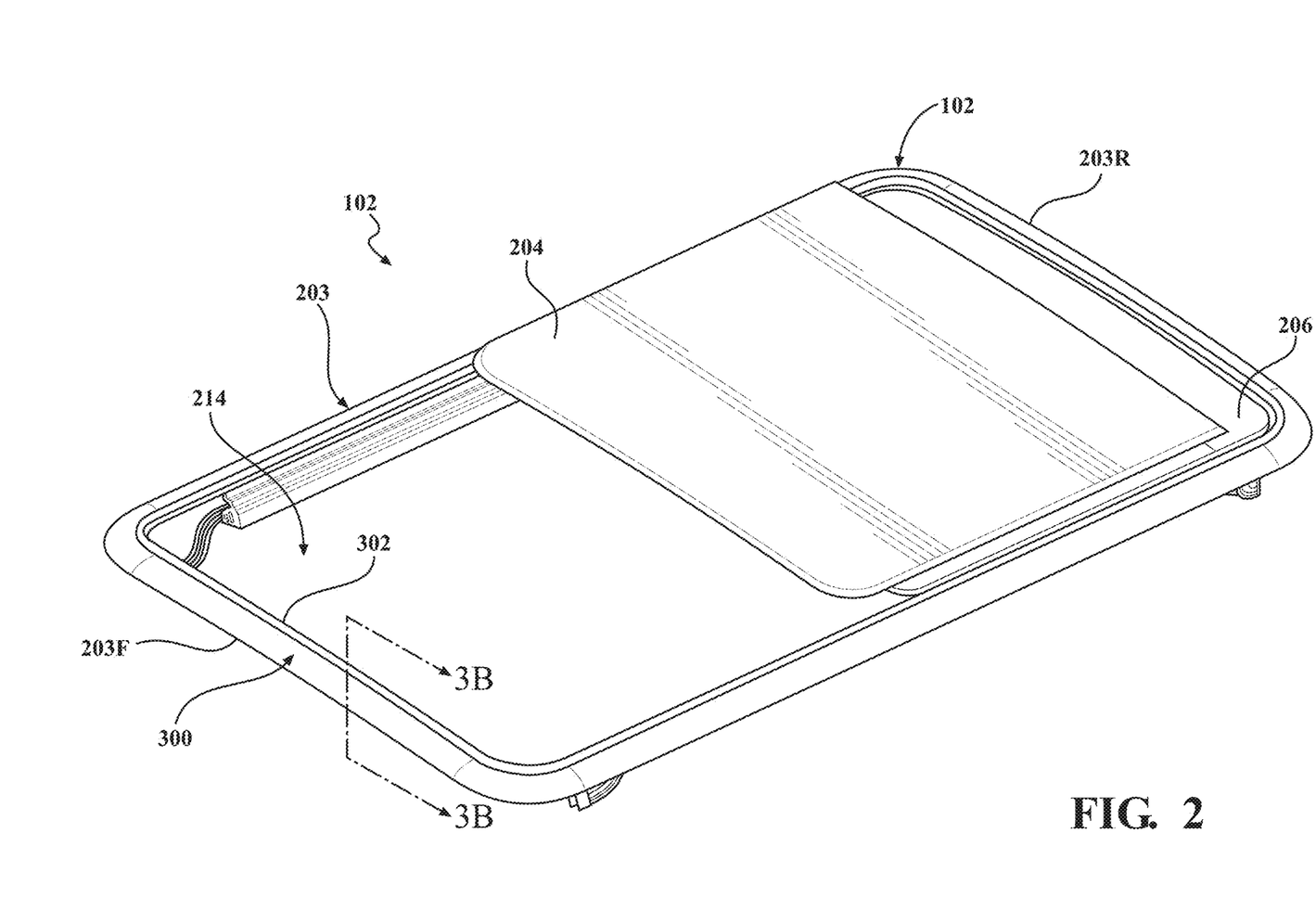
FIG. 2 is a perspective view of the sunroof of FIG. 1 showing the sunroof in an open condition (i.e., in a second state)

FIG. 1 is a partial perspective view of an example vehicle (e.g., a motor vehicle) 100 in which examples of the weather seal system disclosed herein can be implemented. The vehicle 100 of FIG. 1 could be, for example, any of a car, a van, a truck, a sport utility vehicle (SUV), and the like, or any other suitable motor vehicle. According to the illustrated example of FIG. 1, the vehicle 100 includes an example sunroof 102. The sunroof 102 of FIG. 1 can be implemented, for example, using any of a panoramic sunroof, a pop-up sunroof, a sliding sunroof, a spoiler sunroof, and the like, or any other suitable vehicle sunroof. The sunroof 102 is sometimes referred to as a vehicle sunroof. In some examples, the sunroof 102 is structured and/or configured to open, close, vent, and/or change between different sunroof states, for examples, in response to an associated electric motor(s) (not shown) generating an output. As such, the sunroof 102 may be provided with at least one movable panel (e.g., a glass panel) that can be tilted, raised, lowered, and the like. FIG. 1 is a perspective view of the example sunroof 102 showing the sunroof in a closed condition (i.e., in a first state). FIG. 2 is a perspective view of the sunroof 102 of FIG. 1 showing the sunroof in an open condition (i.e., in a second state). When closed or in the first state, the sunroof 102 of FIG. 1 substantially isolates a cabin (not shown) of the vehicle 100 from an outside or external environment, such that external fluids (e.g., water, air, etc.) are prevented from flowing into the cabin through the sunroof 102. Of course, light (e.g., sunlight) may be transmitted through the panel(s) of the sunroof 102 when the sunroof 102 is closed or in the first state. On the other hand, when open or in the second state, the sunroof 102 exposes the vehicle cabin to the external environment, such that ambient air is permitted or enabled to flow into the vehicle cabin, which may be desired by a driver and/or vehicle occupant(s) in certain driving conditions.

FIG. 1 is a partial-view of the vehicle 100 and shows the sunroof 102 in the first state. The sunroof 102 of FIG. 1 is coupled to a roof 202 of the vehicle 100, for example, via one or more fasteners using any one of several fastening methods or techniques. Further, the sunroof 102 of FIG. 1 or at least part thereof is disposed in a sunroof aperture 203 extending through the roof 202. The aperture 203 can be, for example, a relatively large opening in the roof 202 that is sized and/or shaped to receive one or more sunroof components. The sunroof 102 may be provided with one or more example panels (e.g., glass panels) 204, 206, two of which are shown in this example (i.e., a first panel 204 and a second panel 206). In FIGS. 1 and 2, the first panel 204 is movable and/or is configured to move between a first panel position (as shown in FIG. 1) and a second panel position (shown in FIG. 2) different from the first panel position, which changes the state of the sunroof 102. The first panel position can be, for example, a lowered position of the first panel 204 corresponding to the first state of the sunroof 102. On the other hand, the second panel position can be, for example, a tilted position or a raised position of the first panel 204 corresponding to the second state of the sunroof 102. In some examples, the first panel 204 can slide over or under the second panel 206 in a known manner to open the sunroof 102. Additionally or alternatively, in some examples, the second panel 206 of FIG. 1 is likewise movable and/or configured to move between the first panel position and the second panel position.

FIG. 2 is a perspective view of the vehicle sunroof 102 of FIG. 1 and shows the second state of the vehicle sunroof 102. In contrast to the illustrated example of FIG. 1, the first panel 204 of FIG. 2 is its associated second panel position, which is a fully raised position. In particular, the vehicle sunroof 102 of FIG. 2 substantially exposes the vehicle cabin 108 to an outside environment. For example, fluid(s) (such as rain) may pass into the vehicle cabin 108 through an example opening 214 in the sunroof 102 resulting from the first panel 204 moving away from the first panel position. While FIG. 2 depicts the first and second panels 204, 206 overlapping and being substantially parallel relative to each other when the first panel 204 is in the second panel position, in some examples, the second panel position can correspond to a different or intermediate state (e.g., a vented state) of the sunroof 102, wherein the first panel 204 is adjacent and substantially tilted relative to the second panel 206.

Although FIGS. 1 and 2 depict aspects in connection with translating the first panel 204, in some examples, such aspects likewise apply to the second panel 206. For example, the second panel 206 can be similarly for movement to provide an opening in the sunroof 102. To facilitate translating the panel(s) 204, 206 so as to provide associated first and second panel positions (and the associated first and second states of the sunroof), any of a variety of electrically-powered mechanisms (either currently known or later developed) may be employed. These mechanisms will not be discussed in detail herein.

Figure 3A:
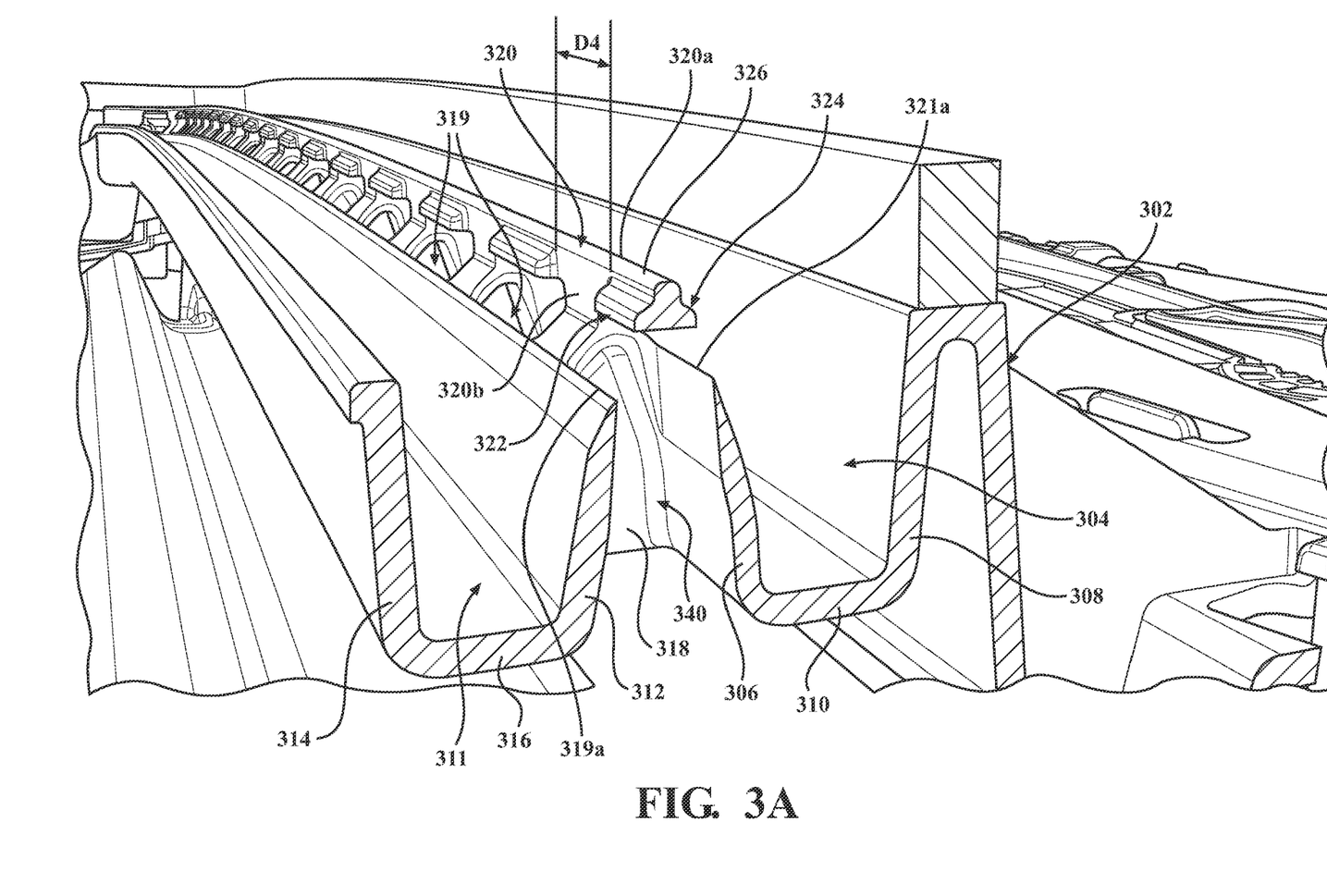
FIG. 3A is a schematic partial perspective cross-sectional view of a mounting base of the weather seal system.

FIGS. 3A-6 show various aspects of a weather seal system (generally designated 300) in accordance with embodiments described herein. The weather seal system may be attached to the vehicle along one or more edges of the sunroof aperture 203. FIG. 3A is a schematic partial perspective cross-sectional view of a mounting base 302 of the weather seal system. FIG. 3B is a schematic partial end view of the mounting base 302 embodiment shown in FIG. 3A. FIG. 3C is a schematic side view of a portion of the mounting base 302 embodiment shown in FIG. 3A.

Figure 4:
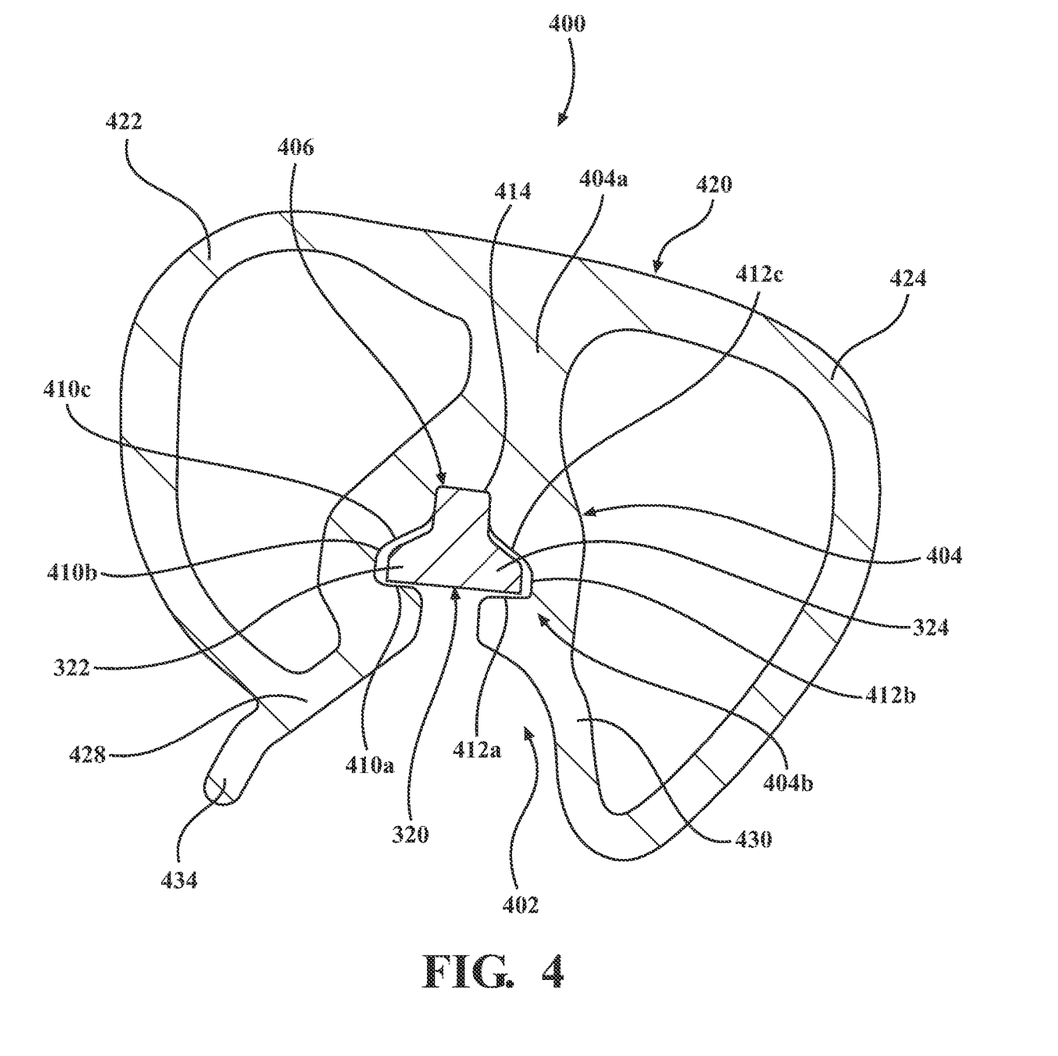
FIG. 4 is a perspective view of the mounting base similar to that shown in FIG. 3A, and also showing an example of a weather seal mounted on a spine of the mounting base.

In one or more arrangements, the weather seal system 300 may include the mounting base 302. The mounting base 302 may provide a structure for supporting and retaining a weather seal 400 (as shown in FIG. 4) for a vehicle sunroof as described herein. The attached weather seal 400 may be mounted and structured to provide a seal between the edges of the aperture 203 and one or more edges of the sunroof panels 204, 206, to prevent entry of moisture, dust, and other foreign substances into the vehicle cabin.

In one or more arrangements, the mounting base 302 (or a portion thereof) may be structured to be connected to the vehicle 100 along associated edges of the sunroof aperture 203, with a length dimension of the mounting base 302 extending along the edge. For example, FIG. 1 shows a mounting base 302 having a length dimension L1 mounted to the vehicle 100 so as to extend along a forward edge 203F of the sunroof aperture 203. In one or more arrangements, all constituents of the mounting base 302 described herein may be integrally formed, for example, by molding. The mounting base 302 may be formed from any suitable material or materials (for example, a suitable polymer).

Referring again to FIGS. 1 and 2, in some arrangements, a mounting base 302 as described herein may be attached to the vehicle 100 along each of a forward edge 203F and a rear edge 203R of the sunroof aperture 203. In other arrangements, one or more mounting base(s) 302 may be attached to the vehicle 100 along all edges of the aperture 203, so as to extend continuously along the entire aperture.

Figure 3B:
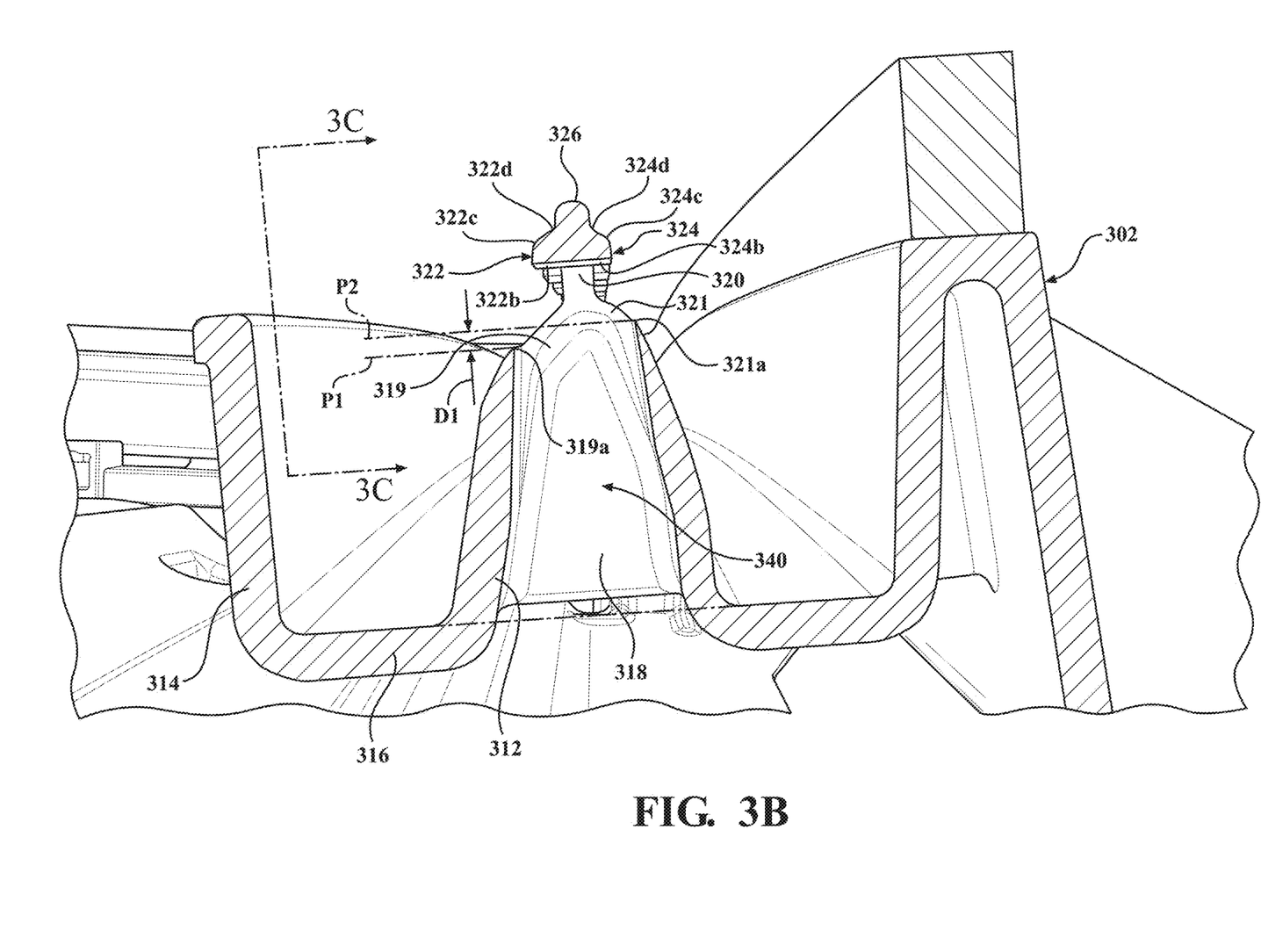
FIG. 3B is a schematic partial end view of the mounting base embodiment shown in FIG. 3A.
Figure 3C:
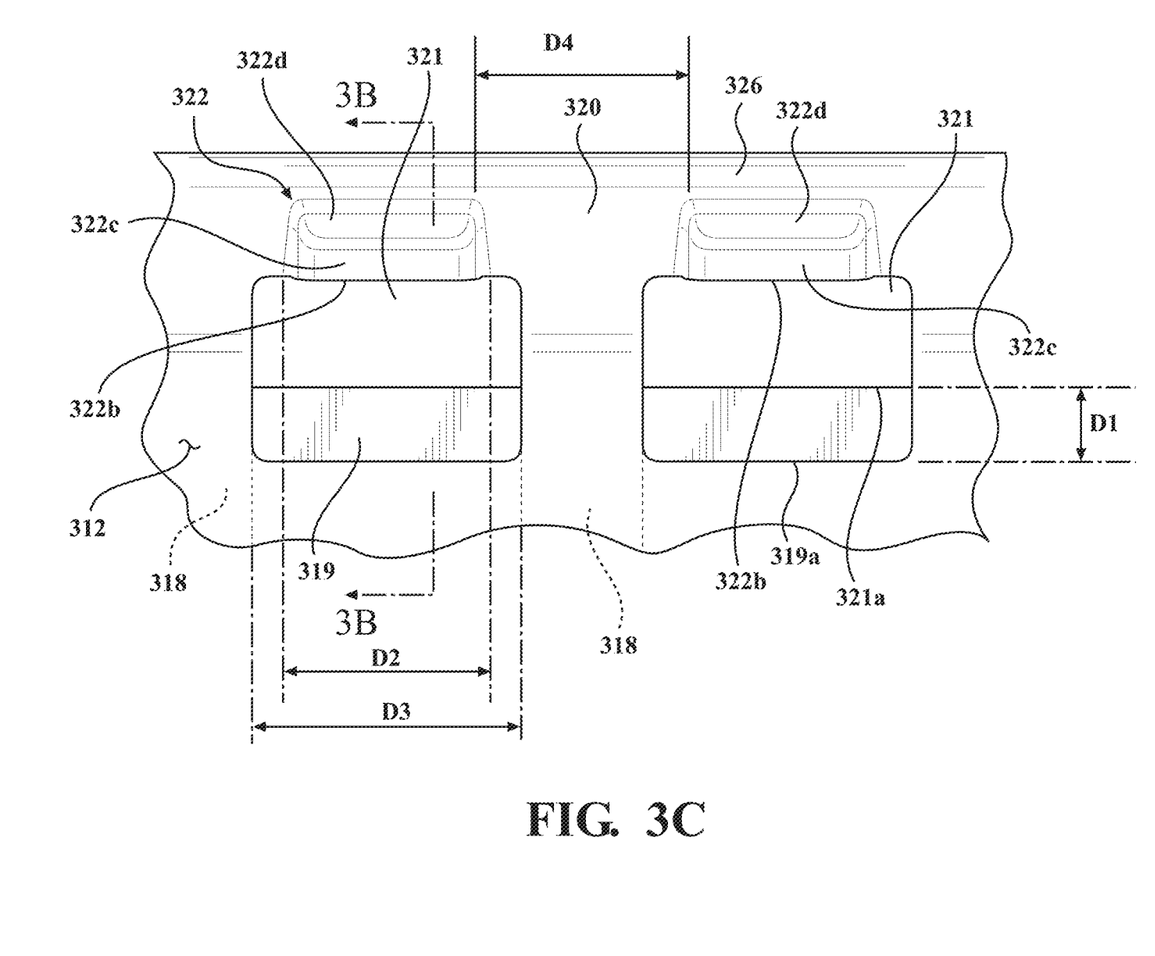
FIG. 3C is a schematic side view of a portion of the mounting base embodiment shown in FIG. 3A.

Referring to FIGS. 3A-3C, the mounting base 302 may include an outboard first channel 304. The outboard first channel 304 may be structured to receive moisture beading off the weather seal 400 (described below) and/or other portions of the vehicle 100 and to enable drainage of the moisture off of the vehicle along an associated drainage flow path (not shown). The mounting base 302 may be securable to the vehicle 100 so that the outboard first channel 304 is adjacent or facing an edge of the sunroof aperture 203. In the exemplary embodiments shown herein, the mounting base 302 is secured to the vehicle 100 so that the outboard first channel 304 resides adjacent the aperture forward edge 203F. In some embodiments, the outboard first channel 304 may extend continuously along an entire length of the mounting base 302.

The outboard first channel 304 may include an interior wall portion 306, an exterior wall portion 308 positioned opposite the interior wall portion, and a floor 310 extending between, and connecting, the interior wall portion 306 and the exterior wall portion 308. In some arrangements, the mounting base 302 may be attached to a portion of the vehicle via the outboard first channel 304.

The mounting base 302 may also include an inboard second channel 311 positioned opposite and spaced apart from the outboard first channel 304. The inboard second channel 311 may extend generally parallel to the outboard first channel 304. The inboard second channel 311 may be structured to receive moisture beading off the weather seal 400 and/or other portions of the vehicle 100 and to enable drainage of the moisture off of the vehicle along an associated drainage flow path (not shown). The mounting base 302 may be securable to the vehicle 100 so that the second channel 311 faces in a direction opposite the facing direction of the outboard first channel 304 (i.e., the inboard second channel 311 may face in a direction away from the edge of the sunroof aperture 203). In some embodiments, the inboard second channel 311 may extend continuously along an entire length of the mounting base 302. The inboard second channel 311 may include an interior wall portion 312, an exterior wall portion 314 positioned opposite the interior wall portion, and a floor 316 extending between, and connecting, the interior wall portion 312 and the exterior wall portion 314.

The mounting base 302 may also include at least two connecting portions 318 positioned between, and connecting, the first and second channels 304, 311. In one or more arrangements, as shown in FIGS. 3A, a plurality of spaced apart connecting portions 318 may be positioned between and connect the first and second channels 304, 311. A respective mounting base cavity 340 may be formed between the connecting portions 318 of each pair of adjacent or successive connecting portions 318 of the plurality of connecting portions 318.

The plurality of spaced apart connecting portions 318 may support a spine 320 structured to extend above the first and second channels 304, 311 when the mounting base 302 is mounted on the vehicle 100. The spine 320 may extend generally parallel to the outboard first channel 304 and/or second channel 311. The spine 320 may extend continuously and coextensively with the outboard first channel 304 and/or inboard second channel 311.

Referring to FIGS. 3A and 3B, at least a first and a second opposed weather seal retention projections 322, 324 may extend from respective opposite first and second sides 320a, 320b of the spine 320 between each pair of adjacent connecting portions 318. In one or more arrangements, a plurality of spaced apart pairs of opposed retention projections 322, 324 may extend from the spine 320 along a length of the spine. In some arrangements, successive spaced apart pairs of opposed retention projections 322, 324 may be spaced apart evenly (for example, by a distance D4)(FIG. 3C) along at least a portion of a length of the spine 320.

In addition, the retention projections of each pair of opposed retention projections 322, 324 extending from the spine 320 may be longitudinally coextensive with each other. For example, referring to FIGS. 3B and 3C, each retention projection 322 projecting from the second side 320b of the spine 320 may have the same length D2 (and be longitudinally coextensive with) an associated retention projection 324 projecting from the first side 320a of the spine 320 opposite the second side 320b of the spine.

Each of the retention projections 324 formed along the first side 320a of the spine 320 may be positioned above an associated opening 321 formed between the spine 320 and the outboard first channel 304 extending along the first side 320a of the spine. Also, each of the retention projections 322 formed along the second side 320b of the spine 320 may be positioned above an associated opening 319 formed between the spine 320 and the inboard second channel 311 extending along the second side 320b of the spine 320.

Referring to FIGS. 3A-3C, a respective first opening 321 may be defined along the first side 320a of the spine by the spine 320, the interior wall portion 306 of the outboard first channel 304, and connecting portions 318 of an associated pair of adjacent connecting portions of the plurality of connecting portions 318. The respective first opening 321 may lead into a respective mounting base cavity 340 formed between the connecting portions 318 of a pair of adjacent connecting portions 318. The mounting base cavity 340 may be formed by passage of a tool used to form the spine 320 and retention projections 322, 324.

In addition, a respective second opening 319 may be defined along the second side 320b of the spine 320 by the spine, the interior wall portion 312 of the inboard second channel 311, and the connecting portions 318 of an associated pair of adjacent connecting portions of the plurality of connecting portions. The respective second opening 319 may lead into the respective mounting base cavity 340 formed between the connecting portions 318.

Referring to FIG. 3C, for each of openings 321, 319, a width D3 of the openings may be greater than a width D2 of an associated one of retention projections 322, 324 positioned above a respective opening. This structure may be formed by a portion of a tool (such as a mold) used to form the spine 320 and the retention projections 322, 324 by extending the tool between a pair of adjacent or successive connecting portions 318 so as to aid in forming portions of the spine 320 and the opposed retention projections 322, 324.

In particular arrangements, the spacing between adjacent or successive connecting portions 318 may be adjusted according to the weather seal retention requirements of a particular application. For example, lengths of the first and second retention projections 322, 324 (described below) extending along the spine 320 between adjacent or successive connecting portions 318 may be increased by increasing the spacing between the adjacent or successive connecting portions. Referring to FIG. 3C, the spacing between any two successive connecting portions 318 may be equal to a width D3 of the respective openings 321, 319 formed between the successive connecting portions. Increasing the overall lengths of the retention projections 322, 324 as a proportion of the length of the mounting base 302 may correspondingly increase the retention forces acting on the weather seal 400, by increasing the total contact areas between the first and second retention projection retention surfaces 324b, 322b (described below) and associated weather seal first and second ledges 410a, 412a as described herein.

Also, as seen in FIGS. 3A-3C, and due to requirements of the tooling used to form the spine 320 and retention projections 322, 324, a plane P1 extending through a lowermost edge 319a of the second opening 319 and parallel to a floor 316 of the inboard second channel 311 may be spaced apart a distance D1 from a plane P2 extending through a lowermost edge 321a of the first opening 321 and parallel to the floor 316 of the inboard second channel 311. As seen from the drawings, the lowermost edge 319a of the second opening 319 is also an uppermost edge of the interior wall portion 312, and the lowermost edge 321a of the first opening 321 is also an uppermost edge of the interior wall portion 306.

Referring to FIGS. 3A and 3B, in one or more arrangements, a shape of the spine 320 along a cross-section taken through the opposed first and second retention projections 322, 324 may include a first retention surface 324b extending perpendicularly from the first side 320a of the spine 320. A second retention surface 322b may extend perpendicularly from the second side 320b of the spine 320 opposite the first retention surface 324b. The first and second retention surfaces 324b, 322b of the respective retention projections 324, 322 may be structured to contact associated respective first and second ledges 412a, 410a formed on the weather seal 400 (described in greater detail below) when the weather seal 400 is mounted on the spine 320, to retain the weather seal 400 on the mounting base 302. In one or more arrangements, the first retention surface 324b and the second retention surface 322b are coplanar.

In addition, a first edge portion 324c may extend perpendicularly from the first retention surface 324b and a second edge portion 322c may extend perpendicularly from the second retention surface 322b opposite the first edge portion 324c. A first chamfered portion 324d may extend from the first edge portion 324c toward a head portion 326 of the spine 320, and a second chamfered portion 322d may extend from the second edge portion 322c toward the spine head portion 326. The second chamfered portion 322d may reside opposite the first chamfered portion 324d. The chamfered portions 324d, 322d may provide lead-in surfaces to facilitate mounting of the weather seal 400 on the spine 320. In some arrangements, an intersection between the first chamfered portion 324d and the spine head 326 may be radiused.

Similarly, an intersection between the second chamfered portion 322d and the spine head 326 may be radiused.

Figure 5:
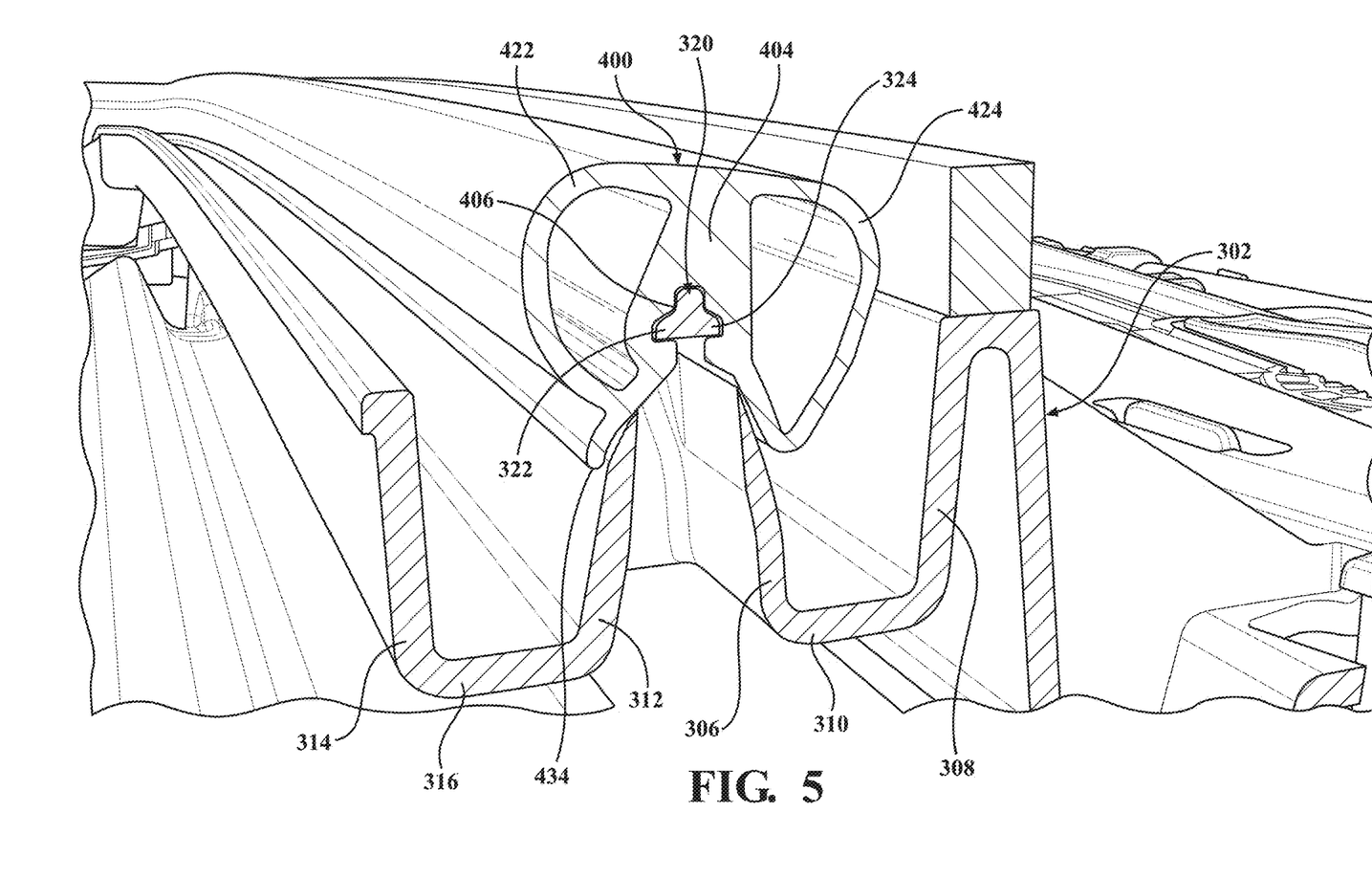
FIG. 5 is a partial cross-sectional view of the mounting base/weather seal combination shown in FIG. 4, illustrating details of the weather seal.
Figure 6:
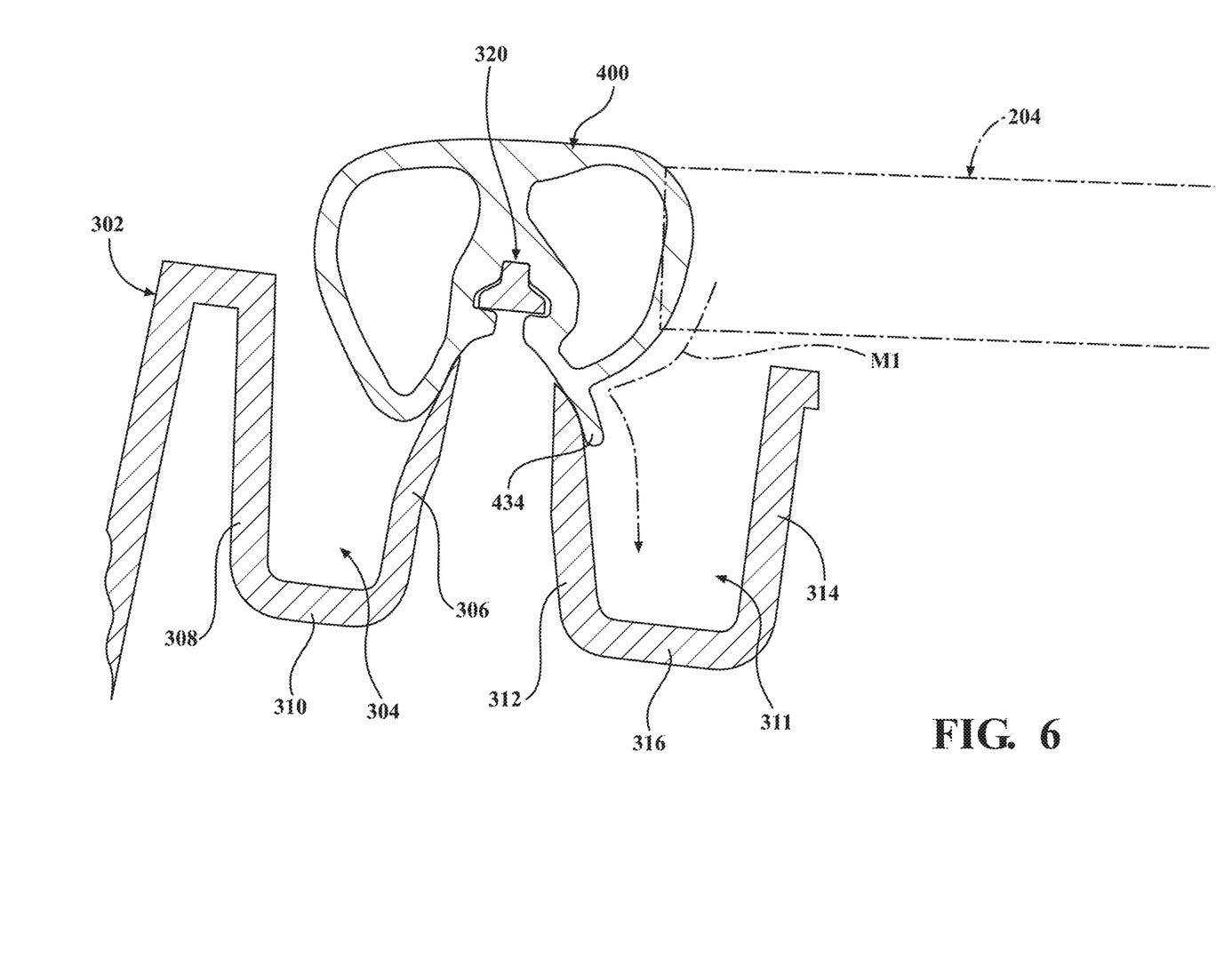
FIG. 6 is a schematic side partial cross-sectional view of the mounting base with a weather seal mounted thereon and illustrating engagement between a sunroof panel of the vehicle and the weather seal.

FIG. 4 is a partial cross-sectional view of the mounting base/weather seal combination shown in FIG. 4, illustrating details of the weather seal 400. FIG. 5 is a perspective view of the mounting base 302 similar to that shown in FIG. 3A, and also showing an example of a weather seal 400 mounted on the spine 320 of the mounting base 302. FIG. 6 is a schematic side partial cross-sectional view of the mounting base 302 with a weather seal 400 mounted thereon. FIG. 6 illustrates engagement between the sunroof panel 204 of the vehicle and the weather seal 400 to form a seal when the sunroof is in a closed condition as shown in FIG. 1. FIG. 6 also illustrates an example of migration of a quantity of moisture M1 down a lip 434 of the seal portion and into the inboard second channel 311.

The weather seal 400 may extend continuously and coextensively with the first and second channels 304, 311. Weather seal 400 may be structured to engage the opposed first and second weather seal retention projections 322, 324 so as to secure the weather seal 400 to the spine 320. In cases where the mounting base 302 extends along the forward edge 203F and/or along the rear edge 203R of the sunroof aperture 203, one or more weather seals 400 may be mounted to the mounting base 302 along these edges of the aperture 203. Alternatively, in cases where the mounting base 302 extends along the entire edge of the aperture 203, one or more weather seals 400 may be mounted to the mounting base 302 along the entire edge of the aperture 203.

Materials of manufacture and/or material surface finishes for the weather seal 400 may include resiliently deformable materials to which water has a relatively high adhesion, and also which are suitable for forming a seal or weatherstripping around openings on a vehicle. A high adhesion may cause moisture to adhere to the outer surface of the weather seal and migrate along the seal until it falls into one of the first and second channels 304, 311 for drainage. Possible materials include EPDM rubber, thermoplastic elastomer mixes of rubber and plastic, thermoplastic olefin polymer/filler blends, thermoplastic styrene polymer/filler blends, vinyl chloride resins, and any other suitable material. The weather seal 400 may be formed by extrusion or by any other suitable method or methods.

In one or more arrangements, the weather seal 400 may include a trunk 404 defining a retention portion 402, and a seal portion 420 extending from the retention portion 402. The trunk 404 may have a relatively narrower first end 404a and relatively wider second end 404b formed opposite the first end 404a. The trunk second end 404b may define retention cavity 406. The retention cavity 406 may be shaped so as to conform to the shape of a cross-section of the spine 320 through the retention projections 322, 324 as previously described, to enable portions of the trunk 404 to engage or grip associated portions of the spine 320, including the retention projections 322, 324. For example, referring to FIGS. 4 and 5, the retention cavity 406 may include a first ledge 412a structured to abut the spine first retention surface 324b when the weather seal 400 is mounted on the mounting base 302. A first sidewall 412b may extend from the first ledge 412a and may be positioned opposite the spine first edge portion 324c. A first sloped portion 412c may extend from the first sidewall 412b and may be positioned opposite the spine first chamfered portion 324d. A spine head receptacle portion 414 may be formed adjacent the first sloped portion 412c and may be structured to receive the spine head 326 therein.

In addition, the retention cavity 406 may also include a second ledge 410a structured to abut the spine second retention surface 322b when the weather seal 400 is mounted on the mounting base 302. A second sidewall 410b may extend from the second ledge 410a and may be positioned opposite the spine second edge portion 322c. A second sloped portion 410c of the retention cavity 406 may extend from the second sidewall 410b and may be positioned opposite the spine second chamfered portion 322d. The second sloped 410c portion may also be positioned adjacent the spine head receptacle portion 414.

Referring to FIGS. 4-6, the seal portion 420 may include a first base wall 430 extending from the trunk 404 in a direction away from the retention cavity 406. A first resiliently deformable sidewall 424 may extend outwardly from the trunk 404, then curve back inwardly toward the first base wall 430 to intersect the first base wall 430. A second base wall 428 may also extend from the trunk 404 in a direction away from the retention cavity 406. A second resiliently deformable sidewall 422 may also extend outwardly from the trunk 404 and opposite the first resiliently deformable sidewall 424, then curving back inwardly toward the second base wall 428 to intersect the second base wall 428.

Referring to FIGS. 5 and 6, if needed, a lip 434 may be formed extending from an intersection between the second resiliently deformable sidewall 422 and the second base wall 428. The lip 434 may be structured to overlap the lowermost edges 319a of the second openings 319 along the length of the mounting base. The overlapping lip 434 may be configured to guide moisture impinging on the seal portion into an associated channel (such as inboard second channel 311 previously described) so that the moisture may be prevented from flowing between the first and second channels 304, 311 into the vehicle cabin.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein. Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claimed terminology such that no inventive subject matter is dedicated to the public.

What is claimed is:

1. A weather seal system for sealing a perimeter of a vehicle sunroof, the system comprising:
   a mounting base including:
      an outboard first channel;
      an inboard second channel spaced apart from, and extending generally parallel to, the first channel;
      at least two connecting portions positioned between and connecting the first and second channels, the connecting portions being spaced apart in a direction extending generally parallel to a longitudinal extent of the first channel;
      a spine supported by the at least two connecting portions so as to reside above the first and second channels when the mounting base is mounted on a vehicle, the spine extending generally parallel to the outboard first channel;

at least a first and a second opposed weather strip retention projections extending from respective opposite first and second sides of the spine; and a weather strip structured to engage the opposed first and second weather strip retention projections so as to secure the weather strip to the spine.

2. The weather seal system of claim 1, comprising a plurality of spaced apart connecting portions, each connecting portion of the plurality of connecting portions being positioned between and connecting the first and second channels, each connecting portion of the plurality of connecting portions also supporting the spine, and wherein a respective mounting base cavity is formed between connecting portions of each pair of adjacent connecting portions of the plurality of connecting portions.

3. The weather seal system of claim 1, further comprising a first opening formed along a first side of the spine, the first opening being defined by the spine, an interior wall portion of the outboard first channel, and the at least two connecting portions, wherein the first opening leads into a respective mounting base cavity formed between the at least two connecting portions of the pair of adjacent connecting portions.

4. The weather seal system of claim 3, further comprising a second opening formed along a second side of the spine opposite the first side of the spine, the second opening being defined by the spine, an interior wall portion of the inboard second channel, and the at least two connecting portions, wherein the second opening leads into the respective mounting base cavity.

5. The weather seal system of claim 4, wherein a plane P1 extending through a lowermost edge of the second opening and parallel to a floor of the inboard second channel is spaced apart a distance D1 from a plane P2 extending through a lowermost edge of the first opening and parallel to the floor of the inboard second channel.

6. The weather seal system of claim 5, wherein the weather seal comprises:
a retention portion;
seal portion extending from the retention portion; and
a lip extending from the seal portion to overlap the lowermost edge the second opening.

7. The weather seal system of claim 6, wherein the retention portion includes a trunk defining a retention cavity, and wherein the seal portion includes:
a first base wall extending from the trunk in a direction away from the retention cavity;
a first resiliently deformable sidewall extending outwardly from the trunk, then curving back inwardly toward the first base wall to intersect the first base wall;
a second base wall extending from the trunk in a direction away from the retention cavity;
a second resiliently deformable sidewall extending outwardly from the trunk and opposite the first resiliently deformable sidewall, then curving back inwardly toward the second base wall to intersect the second base wall, and wherein the lip extends from an intersection between the second resiliently deformable sidewall and the second base wall.

8. The weather seal system of claim 1, wherein a shape of the spine along a cross-section taken through the opposed first and second retention projections includes:

a first retention surface extending perpendicularly from the first side of the spine;
a second retention surface extending perpendicularly from the second side of the spine opposite the first retention surface;
a first edge portion extending perpendicularly from the first retention surface;
a second edge portion extending perpendicularly from the second retention surface opposite the first edge portion;
a first chamfered portion extending from the first edge portion to the spine; and
a second chamfered portion extending from the second edge portion to the spine opposite the first chamfered portion.

9. The weather seal system of claim 8, wherein the first retention surface and the second retention surface are coplanar.

10. The weather seal system of claim 8, wherein the weather strip comprises a retention portion including a retention cavity having:
a first ledge structured to abut the first retention surface when the weather strip is mounted on the mounting base;
a first sidewall extending from the first ledge and positioned opposite the first edge portion;
a first sloped portion extending from the first sidewall and positioned opposite the first chamfered portion;
a spine head receptacle portion adjacent the first chamfered portion, the retention cavity also having;
a second ledge structured to abut the second retention surface when the weather strip is mounted on the mounting base;
a second sidewall extending from the second ledge and positioned opposite the second edge portion; and
a second sloped portion extending from the second sidewall and positioned opposite the second chamfered portion, the second sloped portion also being positioned adjacent the spine head receptacle portion.

11. A weather seal system for sealing a perimeter of a vehicle sunroof, the system comprising:
a mounting base including:
an outboard first channel;
an inboard second channel spaced apart from, and extending generally parallel to, the first channel;
a plurality of spaced apart connecting portions positioned between and connecting the first and second channels, a respective mounting base cavity being formed between connecting portions of each pair of adjacent connecting portions of the plurality of connecting portions;
a spine supported by the plurality of connecting portions so as to reside above the first and second channels when the mounting base is mounted on a vehicle, the spine extending generally parallel to the outboard first channel; and
at least a first and a second opposed weather strip retention projections extending from respective opposite first and second sides of the spine; and
a weather strip structured to engage the opposed first and second weather strip retention projections so as to secure the weather strip to the spine.

\* \* \* \* \*